(12) United States Patent
Nyuunoya

(10) Patent No.: US 9,235,484 B2
(45) Date of Patent: Jan. 12, 2016

(54) CLUSTER SYSTEM

(71) Applicant: NEC Corporation, Minato-ku, Tokyo (JP)

(72) Inventor: Yoshinori Nyuunoya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 14/196,393

(22) Filed: Mar. 4, 2014

(65) Prior Publication Data

US 2014/0250320 A1    Sep. 4, 2014

(30) Foreign Application Priority Data

Mar. 4, 2013  (JP) .................................. 2013-042016

(51) Int. Cl.
*G06F 11/20*    (2006.01)

(52) U.S. Cl.
CPC .................................. *G06F 11/2092* (2013.01)

(58) Field of Classification Search
CPC ............ G06F 11/2028; G06F 11/1425; G06F 11/0709; G06F 11/0793; G06F 11/0727
See application file for complete search history.

(56) References Cited

U.S. PATENT DOCUMENTS

| 7,039,827 B2* | 5/2006 | Meyer ................... G06F 3/0605 714/4.11 |
| 7,739,541 B1* | 6/2010 | Rao ....................... G06F 11/0709 709/205 |
| 2004/0123053 A1* | 6/2004 | Karr .................... G06F 11/0727 711/152 |
| 2007/0022138 A1* | 1/2007 | Erasani ............... G06F 11/0709 1/1 |
| 2011/0179231 A1* | 7/2011 | Roush ................... G06F 3/0622 711/152 |

FOREIGN PATENT DOCUMENTS

JP    2012-173752 A    9/2012

* cited by examiner

*Primary Examiner* — Jigar Patel

(57) ABSTRACT

A cluster system according to the present invention includes an active server and a standby server which have a failover function, and a shared disk. The active server includes a control device configured to operate free of influence from an OS, and a disk input/output device configured to input and output data into and from the shared disk. The control device of the active server includes a communication module configured to communicate with the standby server, and an initialization module configured to, when a failure occurs in the active server, initialize the disk input/output device and notify to the standby server via the communication module.

14 Claims, 10 Drawing Sheets

CLUSTER SYSTEM

INCORPORATION BY REFERENCE

This application is based upon and claims the benefit of priority from Japanese patent application No. 2013-042016, filed on Mar. 4, 2013, the disclosure of which is incorporated herein in its entirety by reference.

TECHNICAL FIELD

The present invention relates to a cluster system, more specifically, relates to a cluster system having a failover function.

BACKGROUND ART

A failover cluster system is known, which is equipped with both an active server and a standby server and a shared disk to prevent the stoppage of processing due to occurrence of a computer failure, for example, as shown in Patent Document 1. In such a failover cluster system, data of a business application running in each of the servers are stored in the shared disk that can be accessed from both the active server and the standby server. When a failure occurs in the active server, cluster software starts the business application in the standby server by executing switchover (referred to as "failover" hereinafter) of the business application. The business application started in the standby server uses the data stored in the shared disk to restart business processing from a time point of stoppage of the business application in the active server.

Since a failover cluster system equipped with a shared disk stores data in the shared disk as mentioned above, there is a fear that the data is destroyed if both the active server and the standby server write into the shared disk simultaneously. Therefore, such a system executes exclusive control so as to cause only the active server to write usually.

(1: Exclusive Control at the Time of Failover)

For executing failover from an active server to a standby server, it is required to start a business application in the standby server after certainly stopping the active server from accessing a shared disk.

(2: Exclusive Control in the Split-Brain State)

There is a structure (a split-brain solution method) that, when a cluster goes into a split-brain state in which the cluster cannot recognize the statues of servers due to a failure of a network between the servers, a server to which the cluster should switch a business application is decided based on the presence of access to a shared disk. This split-brain solution method possibly invites a situation that, when a server with a fault network device accesses the shared disk, the cluster falsely recognizes the fault server is normally operating. Thus, it is required to securely prevent the fault server from accessing the shared disk.

As stated above, when executing failover in a cluster system, it is required to properly execute exclusive control to certainly stop a fault server from accessing a shared disk.

[Patent Document 1] Japanese Unexamined Patent Application Publication No. JP-A 2012-173752

As a method for stopping access to a shared disk in a cluster system, unmounting a disk, making the port of a FC (Fibre Channel) switch inactive, causing an OS (Operating System) panic, or the like, is used. However, each of the abovementioned methods has a problem as described below.

Unmounting a disk has a problem that it takes time to execute and, when a process being written in exists, unmounting the disk fails. Making the port of a FC switch inactive has a problem that it takes time to connect because a server connects to a module outside the server and the server cannot connect to the FC switch depending on the type of a failure. Causing an OS panic has a problem that an input/output remaining in the cache of a HBA (Host Bus Adapter) card may be written in.

Further, in the case of executing I/O fencing that prevents writing into a shared disk in a HW (Hardware) layer, supply of power to the card is shut off, for example. Executing I/O fencing in the HW layer realizes secure I/O fencing, but there is no means for notifying the completion of I/O fencing to a standby server. Therefore, for example, the standby server needs to wait for heart beat communication timeout to start failover, and there is a problem that it is impossible to rapidly execute failover.

Thus, there has been a problem that it is impossible to speedily execute failover while protecting shard data in a failover cluster system.

SUMMARY

Accordingly, an object of the present invention is to provide a cluster system capable of solving the abovementioned problem that it is impossible to speedily execute failover while protecting shard data.

A cluster system as an exemplary embodiment of the present invention includes:

an active server and a standby server configured to execute mutually identical applications and having a failover function enabling one of the servers to take over the other's processing by the application; and a shared disk storing data that can be shared by the active server and the standby server.

The active server includes a control device configured to operate free of influence from an operating system installed in the active server, and a disk input/output device connected to the shared disk and configured to input and output data into and from the shared disk.

The control device of the active server includes a communication module configured to communicate with the standby server, and an initialization module configured to, when a failure occurs in the active server, initialize the disk input/output device to execute I/O fencing on the shared disk and also notify completion of the I/O fencing to the standby server via the communication module.

The standby server has a failover function that, in response to notification of completion of the I/O fencing from the control device of the active server, the application on the standby server takes over processing by the application on the active server.

Further, an active server as another exemplary embodiment of the present invention is an active server included by a cluster system.

The cluster system includes: the active server and a standby server configured to execute mutually identical applications and having a failover function enabling one of the servers to take over the other's processing by the application; and a shared disk storing data that can be shared by the active server and the standby server.

The active server includes: a control device configured to operate free of influence from an operating system installed in the active server; and a disk input/output device connected to the shared disk and configured to input and output data into and from the shared disk.

The control device includes a communication module configured to communicate with the standby server, and an initialization module configured to, when a failure occurs in the active server, initialize the disk input/output device to execute I/O fencing on the shared disk and also notify completion of the I/O fencing to the standby server via the communication module.

Further, a non-transitory computer-readable medium as another exemplary embodiment of the present invention stores a program including instructions for causing a control device included by an active server included by a cluster system to execute processing by an initialization module.

The cluster system includes: the active server and a standby server configured to execute mutually identical applications and having a failover function enabling one of the servers to take over the other's processing by the application; and a shared disk storing data that can be shared by the active server and the standby server.

The active server includes: the control device configured to operate free of influence from an operating system installed in the active server; and a disk input/output device connected to the shared disk and configured to input and output data into and from the shared disk.

The control device includes the communication module configured to communicate with the standby server.

The initialization module is configured to, when a failure occurs in the active server, initialize the disk input/output device to execute I/O fencing on the shared disk and also notify completion of the I/O fencing to the standby server via the communication module.

Further, a failover method as another exemplary embodiment of the present invention is a failover method by a cluster system.

The cluster system includes: an active server and a standby server configured to execute mutually identical applications and having a failover function enabling one of the servers to take over the other's processing by the application; and a shared disk storing data that can be shared by the active server and the standby server.

The active server includes: a control device configured to operate free of influence from an operating system installed in the active server; and a disk input/output device connected to the shared disk and configured to input and output data into and from the shared disk.

The control device includes a communication module configured to communicate with the standby server.

The failover method includes:

when a failure occurs in the active server, initializing the disk input/output device to execute I/O fencing on the shared disk and notifying completion of the I/O fencing to the standby server via the communication module, by the control device of the active server; and in response to notification of completion of the I/O fencing from the control device of the active server, making the application on the standby server take over processing by the application on the active server, by the standby server.

Further, a failover method as another exemplary embodiment of the present invention is a failover method by a cluster system.

The cluster system includes: an active server and a standby server configured to execute mutually identical applications and having a failover function enabling one of the servers to take over the other's processing by the application; and a shared disk storing data that can be shared by the active server and the standby server.

The active server includes: a control device configured to operate free of influence from an operating system installed in the active server; and a disk input/output device connected to the shared disk and configured to input and output data into and from the shared disk.

The control device includes a communication module configured to communicate with the standby server.

The failover method includes:

when a failure occurs in the active server, initializing the disk input/output device to execute I/O fencing on the shared disk and notifying completion of the I/O fencing to the standby server via the communication module, by the control device of the active server.

With the configurations as described above, the present invention enables speedily executing failover while protecting shard data.

EXEMPLARY EMBODIMENT

<First Exemplary Embodiment>

Figure 1:
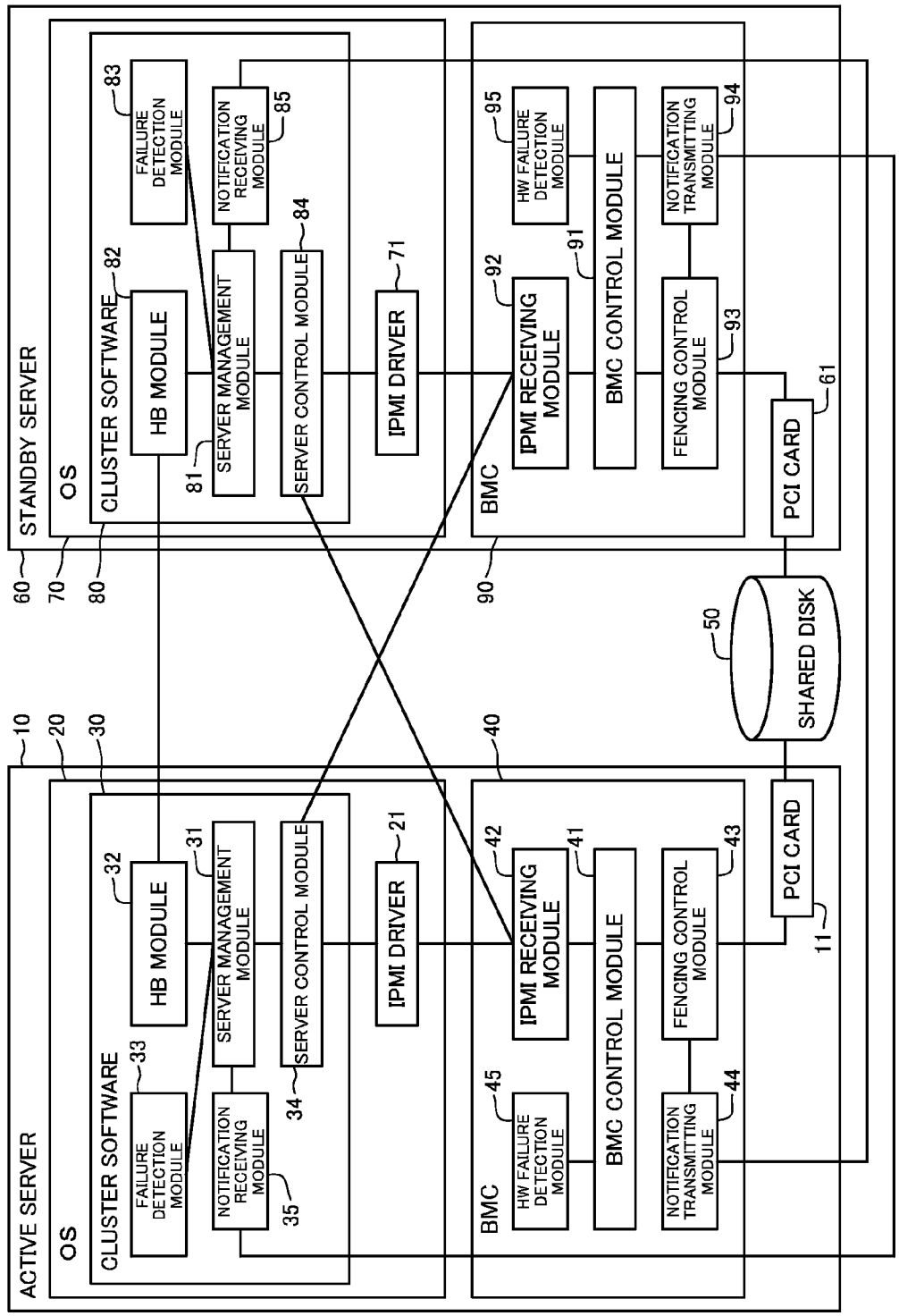
FIG. 1 is a block diagram showing a configuration of a cluster system in a first exemplary embodiment of the present invention.

Referring to FIGS. 1 to 9, a first exemplary embodiment of the present invention will be described. FIG. 1 is a diagram showing a configuration of a cluster system. FIGS. 2 to 9 are diagrams showing an operation of the cluster system.

[Configuration]

A cluster system 1 in this exemplary embodiment is a failover cluster system equipped with a shared disk. As shown in FIG. 1, this cluster system 1 includes an active server 10 and a standby server 60, and includes a shared disk 50 which can be accessed from and shared by both the servers 10 and 60.

The active server 10 and the standby server 60 have almost the same configurations, and can execute the same business applications. The cluster system 1 has a failover function that, when a failure occurs in the active server 10, the business application of the standby server 60 takes over a process being executed by the business application of the active server 10. Since the configurations of the active server 10 and the standby server 60 are almost the same, the configuration of the active server 10 will be chiefly described in detail below.

The active server 10 is configured by an information processing device including an arithmetic device and a storage device. The active server 10 includes an OS (Operating System) 20 structured by installation of a program into the arithmetic device, and the OS 20 includes cluster software 30 and an IPMI driver 21. Moreover, the OS 20 includes a business application, which is not shown in the drawings.

Further, the active server 10 includes a BMC (Base Management Controller) 40 (a control device) that manages hardware (HW) installed in the server 10, and a PCI card 11 (a disk input/output device) that accesses the shared disk 50. The BMC 40 is configured to operate free of an influence of the OS 20. Below, the respective components will be described in more detail.

The cluster software 30 of the OS 20 includes a server management module 31, a HB (Heart Beat) module 32, a failure detection module 33, a server control module 34, and a notification receiving module 35.

The server management module 31 manages the status (running status/stopped status) of each of the servers configuring the cluster system and the status (running status/stopped status; a running server) of the business application. Moreover, upon receiving failure information or information on stoppage of the other server from the HB module 32 or the failure detection module 33, the server management module 31 checks the status of the business application and, in the case of determining that the application has stopped or cannot normally operate, orders failover of the business application.

The HB module 32 determines whether each of the servers configuring the cluster system is running or stopped by periodical transmission/reception of network packets and writing into the disk. In a case where the other server has transit from the running status to the stopped status or from the stopped status to the running status, the HB module 32 notifies change of the status of the server to the server management module 31.

The failure detection module 33 monitors whether computer resources of its own server is normally operating or not, for example, whether its own server can access the internal disk and the shared disk, whether the business application is alive or not, and whether network communication can be normally performed. In the case of detecting an abnormality in the computer sources, the failure detection module 33 notifies the abnormality to the server management module 31.

In accordance with the order from the server management module 31, the server control module 34 shuts down its own server 10, and gives an order to the BMC of its own server 10 and the BMC 90 of the other server 60, thereby controlling running/stoppage of its own server 10 and the other server 60.

The communication receiving module 35 receives a notification of the completion of I/O fencing from the BMC 90 of the other server 60, and notifies to the server management module 31.

The configurations of an OS 70 and cluster software 80 of the standby server 60 are equivalent to those of the OS 20 and the cluster software 30 mentioned above. That is to say, the OS 70 of the standby server 60 includes an IPMI driver 71, and the cluster software 80 includes a server management module 81, an HB (Heart Beat) module 82, a failure detection module 83, a server control module 84, and a notification receiving module 85.

Next, the configuration of the BMC 40 of the active server 10 will be described in detail. The BMC 40 includes a BMC control module 41, an IPMI receiving module 42, a fencing control module 43, a notification transmitting module 44, and a HW failure detection module 45, which are structured by installation of a program into an arithmetic device of the BMC 40.

The BMC control module 41 (an initialization module) manages the slot number of the PCI card 11 as the I/O fencing target notified from the cluster software 30 at the time of startup, and the IP address of the standby server 60 as the destination of a fencing completion notification. The slot number of the PCI card 11 is access information for accessing the PCI card 11, and the IP address of the standby server 60 is address information that is the address of the standby server 60 at the time of notification of information.

Further, the BMC control module 41 instructs the fencing control module 43 to execute I/O fencing when receiving an I/O fencing instruction from the cluster software 30 or when receiving a notification of a HW failure from the HW failure detection module 45.

The IPMI receiving module 42 receives an IPMI control command (an I/O fencing instruction or setting information) from the cluster software 30 of its own server 10 or the cluster software 80 of the other server 60, and notifies to the BMC control module 41.

The fencing control module 43 (the initialization module) executes I/O fencing by receiving an I/O fencing instruction from the BMC control module 41, and resetting a PCI slot to which the designated PCI card 11 is connected. After completion of the I/O fencing, the fencing control module 43 notifies completion of the I/O fencing to the notification transmitting module 44. The I/O fencing described above is, in a case where any of servers configuring a cluster system stops, isolating the server from a File System (a shard disk) so that I/O does not occur.

Upon receiving a notification of the completion of I/O fencing, the notification transmitting module 44 (a communication module) notifies the completion of I/O fencing to the registered IP address via a network.

The HW failure detection module 45 monitors a HW module configuring the server 10 and, when detecting a failure, notifies detection of the failure to the BMC control module.

The configuration of a BMC 90 of the standby server 60 is equivalent to that of the BMC 40 described above. That is to say, the BMC 90 of the standby server 60 includes a BMC control module 91, an IPMI receiving module 92, a fencing control module 93, a communication transmitting module 94, and a HW failure detection module 95, which are structured by installation of a program in an arithmetic device of the BMC 90.

[Operation]

Next, referring to FIGS. 2 to 9, an operation of the cluster system described above will be illustrated. Below, the operation of the cluster system will be described in the following four cases:

(1) when the cluster starts;
(2) a case where the cluster software detects a failure of its own server;
(3) a case where the BMC detects a HW failure of its own server; and
(4) a case where the cluster software detects stoppage of the other server.

(1) When the Cluster Starts

Figure 2:
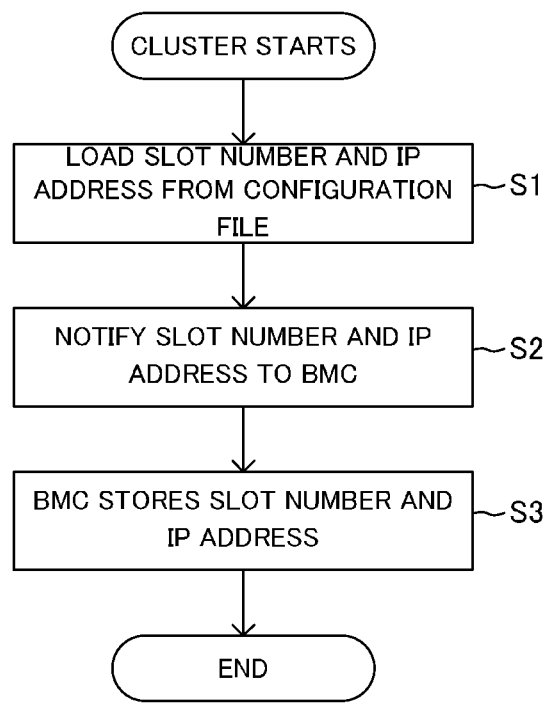
FIG. 2 is a flowchart showing an operation when the cluster starts up in the cluster system disclosed in FIG. 1.
Figure 3:
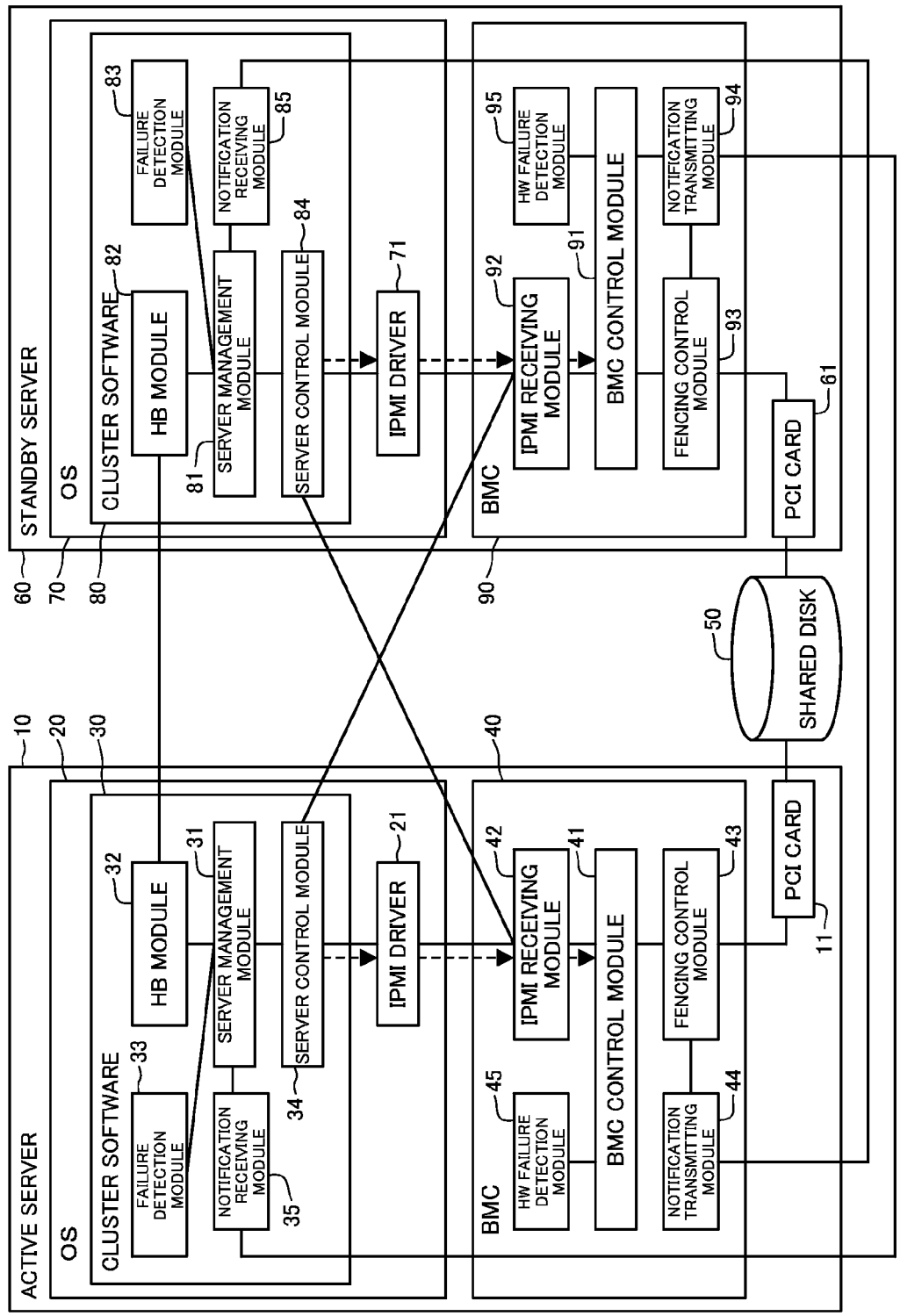
FIG. 3 is a diagram for explaining the operation when the cluster starts up in the cluster system disclosed in FIG. 1.

First of all, referring to a flowchart of FIG. 2 and dashed arrows in FIG. 3, an operation when the cluster system starts will be described.

First, when the active server 10 starts, the server control module 34 loads the slot number of the PCI card 11 connected to the shared disk 50 and the IP address of the standby server 60 from a previously registered configuration file (step S1), and sends a notification to the BMC 40 via the IPMI driver 21 (step S2). The IPMI receiving module 42 of the BMC 40 having received the notification notifies the slot number of the PCI card 11 and the IP address of the standby server to the BMC control module 41. Then, the BMC control module 41 stores the slot number of the PCI card 11 and the IP address of the standby server 60 having been notified, into a volatile memory within the module (step S3). Also in the standby server 60, the same process is executed.

In a case where the initial setup described above is not executed, the cluster system operates as a general cluster system that detects stoppage of the other server based on HB timeout and stops I/O to and from a shared disk by OS panic or unmounting of a disk.

(2) A Case where the Cluster Software Detects a Failure of its Own Server

Figure 4:
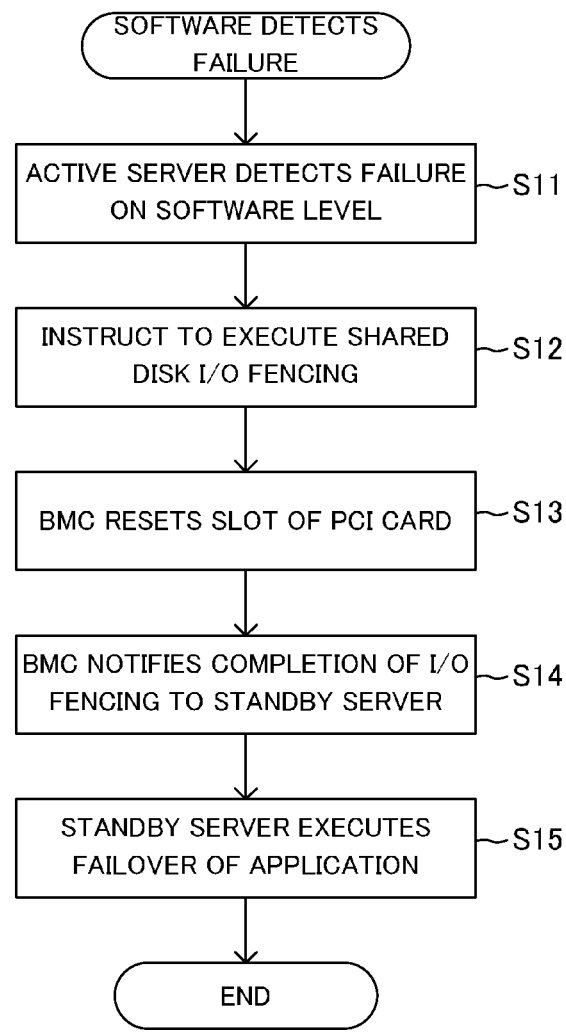
FIG. 4 is a flowchart showing an operation when a software failure is detected in the cluster system disclosed in FIG. 1.
Figure 5:
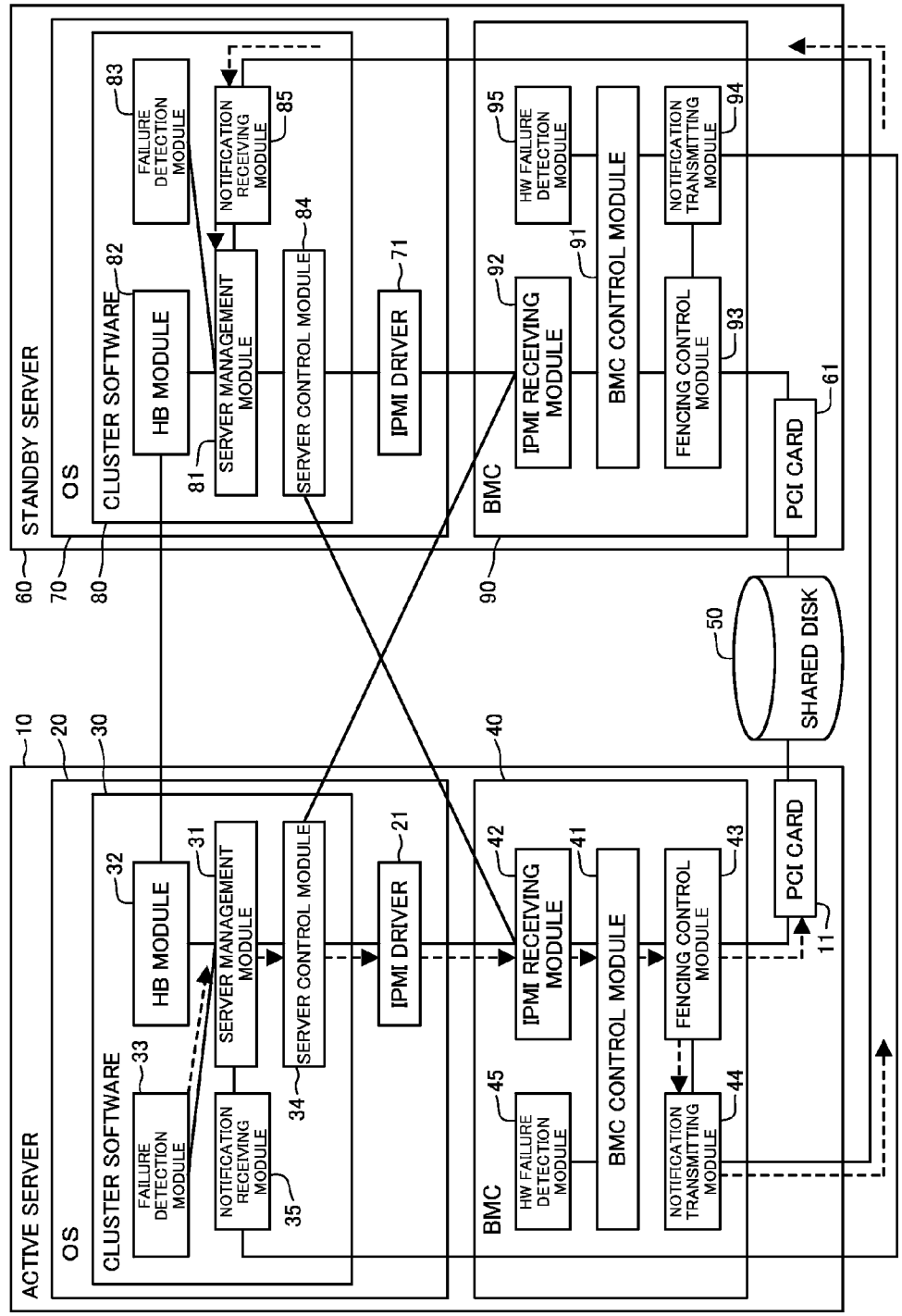
FIG. 5 is a flowchart showing the operation when the software failure is detected in the cluster system disclosed in FIG. 1.

Next, referring to a flowchart of FIG. 4 and dashed arrows in FIG. 5, an operation when the cluster software detects a failure of its own server will be described. In this failure case, the failure detection module 33 configuring the cluster software 30 on the active server 10 detects a failure. A failure in this case is a failure that can be detected on the software level, for example, missing of the business application, a failure detected on the level of a driver such as a NIC driver and a disk driver, and so on.

First, upon detecting a failure, the failure detection module 33 notifies occurrence of the failure to the server management module 31 (step S11). The server management module 31 confirms that the I/O fencing function by the BMC 40 is valid, and speedily starts a process of failover of the business application.

In order to stop I/O to and from the shared disk 50, the server management module 31 instructs the server control module 34 to execute a fencing process to prevent I/O to and from the shared disk 50 (step S12). As soon as being instructed to execute I/O fencing by the server management module 31, the server control module 34 notifies an I/O fencing instruction and the slot number of the target PCI card 11 to the BMC 40 via the IPMI driver 21.

Subsequently, the IPMI receiving module 42 receives the I/O fencing instruction and the slot number of the target PCI card via the IPMI driver 21. The IPMI receiving module 42 notifies the I/O fencing instruction and the slot number of the target PCI card 11 to the BMC control module 41. The BMC control module 41 notifies the I/O fencing instruction and the slot number of the target PCI card 11 to the fencing control module 43. The BMC control module 41 may notify the slot number of the PCI card 11 registered at the time of startup to the fencing control module 43.

Upon receiving the I/O fencing instruction, the fencing control module 43 resets (initializes) the PCI card 11 with respect to the slot number of the PCI card 11 having been designated (step S13). Consequently, it is possible to more securely stop I/O to and from the shared disk 50 than in the case of controlling I/O fencing on the software level.

As stated above, when completing reset of the PCI card 11, the fencing control module 43 instructs the notification transmitting module 44 to notify the completion of I/O fencing. The notification transmitting module 44 transmits a notification of the completion of I/O fencing to a previously registered notification destination (the IP address of the standby server 60) (step S14). As a method for notification, for example, SNMP Trap via the network is used. A series of processes from reception of an I/O fencing instruction to transmission of a completion notification to the standby server 60 by the BMC 40 described above is referred to as an I/O fencing process by the BMC.

After that, the notification receiving module 85 configuring the clusterware 80 on the standby server 60 receives the notification of the completion of I/O fencing on the active server 10 from the BMC 40 of the active server 10 via the network, and notifies information of the server that I/O fencing has been completed to the server management module 81. When receiving the I/O fencing completion notification and the information on the active server 10 of the target server, the server management module 81 starts failover of the business application having been running on the server 10. Consequently, failover of the business application is completed, and operation restarts on the standby server 60 (step S15).

In a case where the cluster system is configured by three or more servers, one of the servers is determined as the destination of failover of the business application in accordance with previously registered priority orders or a rule such as the status of the space of the resource. A series of processes from reception of an I/O fencing completion notification by the notification receiving module 85 of the standby server 60 to execution of failover is referred to as a cluster reconfiguration process.

(3) A Case where the BMC Detects a HW Failure of its Own Server.

Figure 6:
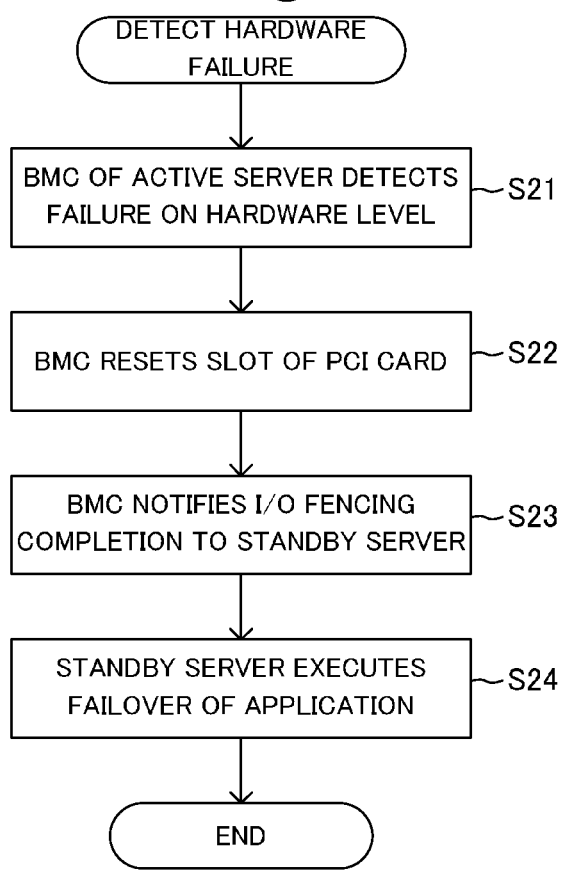
FIG. 6 is a flowchart showing the operation when a hardware failure is detected in the cluster system disclosed in FIG. 1.
Figure 7:
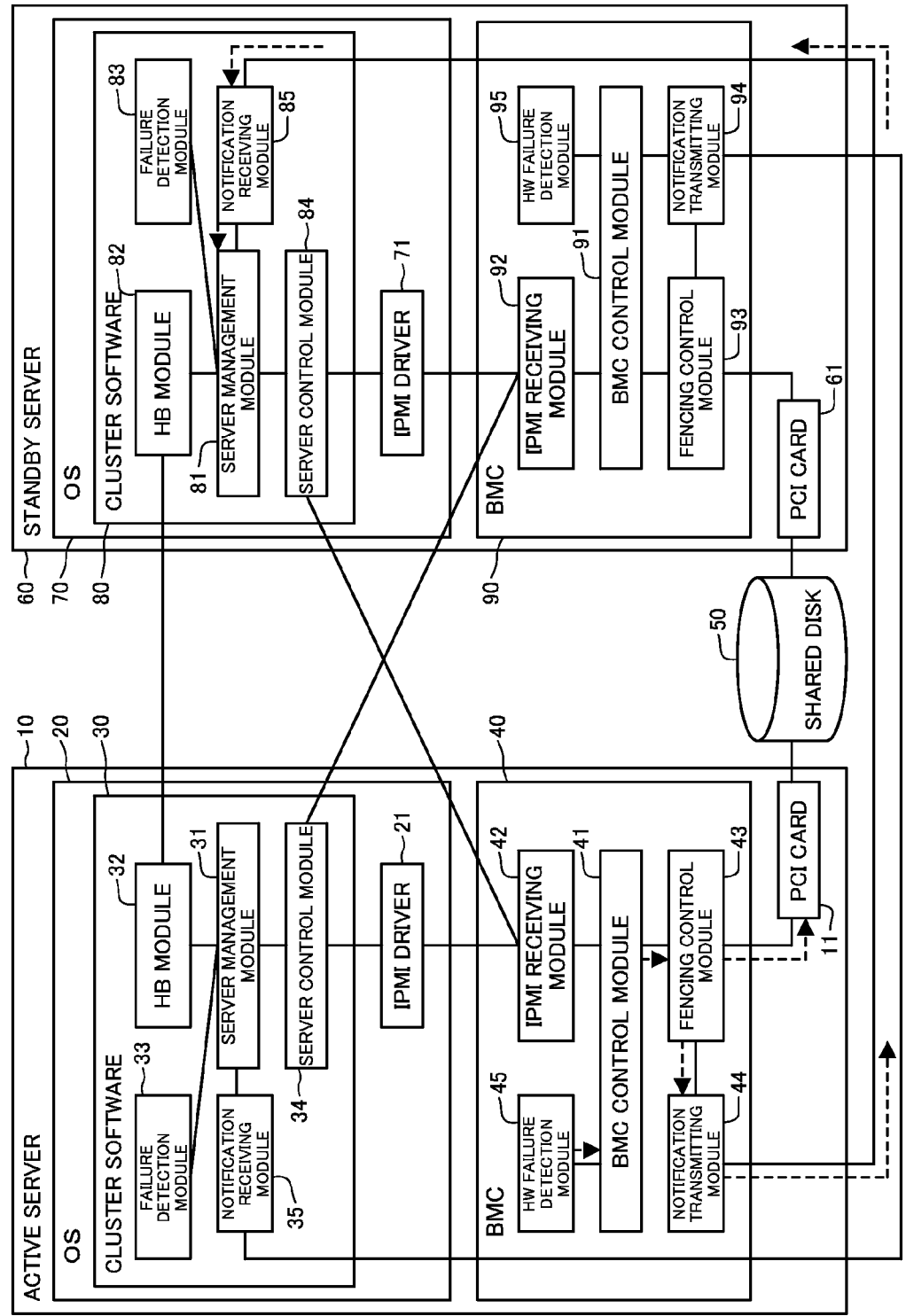
FIG. 7 is a flowchart showing the operation when the software failure is detected in the cluster system disclosed in FIG. 1.

Next, referring to a flowchart of FIG. 6 and dashed arrows in FIG. 7, an operation when the BMC 40 of the active server 10 detects a HW failure in its own server will be described.

In this case, the HW failure detection module 45 configuring the BMC 40 of the active server 10 detects a failure (step S21). A failure in this case is a failure that can be detected on the hardware level, such as sensor abnormality, temperature increase and voltage decrease in the hardware (HW).

First, when detecting a failure, the HW failure detection module 45 notifies occurrence of the failure to the BMC control module 41. The BMC control module 41 checks the failure and, when determining as a failure requiring to stop the active server 10, notifies an I/O fencing instruction and the slot number of the PCI card 11 stored in the startup process to the fencing control module 43 (step S22).

The fencing control module 43 resets the slot with the designated number of the PCI card 11 (step S22). Thus, I/O fencing to stop I/O to and from the shared disk 50 is executed.

Upon completing reset of the slot of the PCI card 11, the fencing control module 43 instructs the notification transmitting module 44 to notify the completion of I/O fencing. The notification transmitting module 44 transmits a notification of the completion of I/O fencing to a previously registered notification destination (the IP address of the standby server 60) (step S23).

The clusterware 80 of the standby server 60 receives the I/O fencing completion notification, and executes the cluster reconfiguration process (step S24).

(4) A Case Where the Cluster Software Detects Stoppage of the Other Server.

Figure 8:
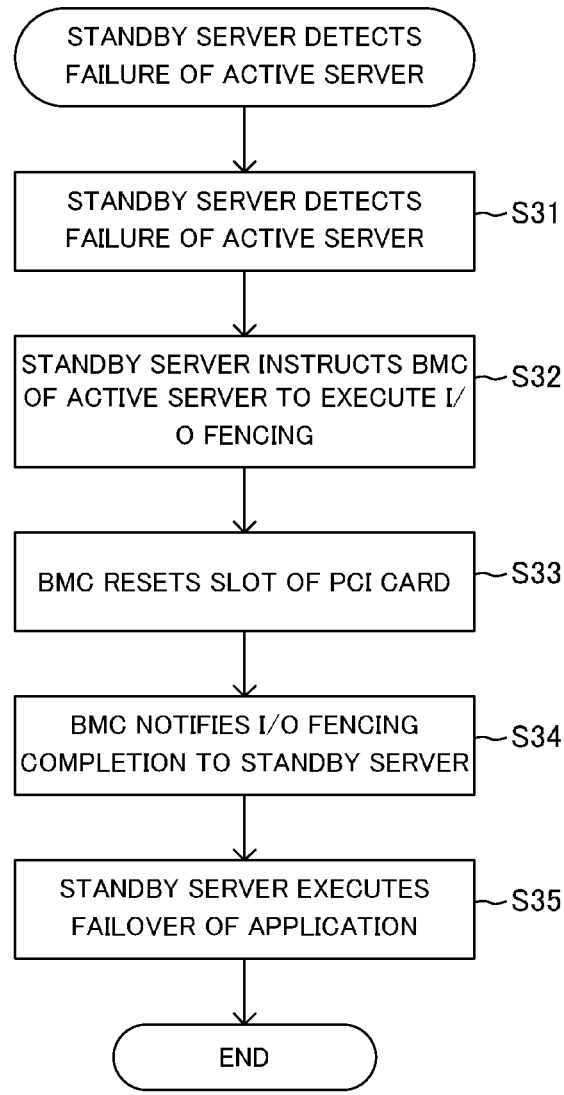
FIG. 8 is a flowchart showing an operation when a standby server detects a failure of an active server in the cluster system disclosed in FIG. 1.
Figure 9:
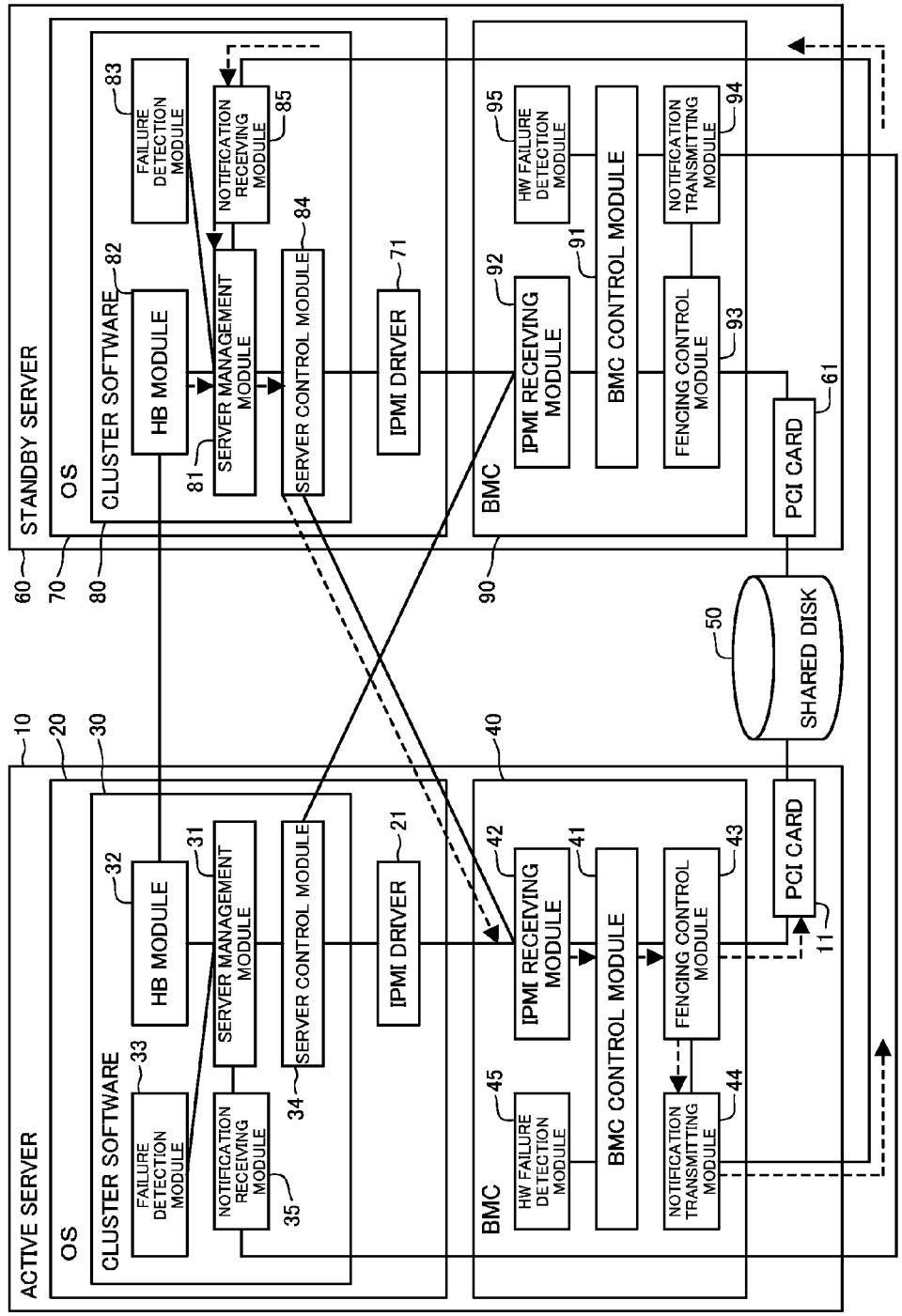
FIG. 9 is a diagram for explaining the operation when the standby server detects the failure of the active server in the cluster system disclosed in FIG. 1.

Next, referring to a flowchart of FIG. 8 and dashed arrows in FIG. 9, an operation when the cluster software 80 of the standby server 60 detects a failure of the active server will be described.

In this case, the HB module 82 configuring the cluster software 80 of the standby server 60 detects a failure of the active server 10. A failure in this case is stall or panic of the OS 20 and stoppage of the cluster software 30 in the active server 10.

The HB module 82 periodically performs heart beat communication with the HB module 32 of the active server 10. In this instance, when the HB module 82 goes into a state in which the HB module 82 cannot perform heart beat communication for a given period, the HB module 82 determines that the active server 10 has stopped (step S31), and notifies an abnormality of heart beat communication to the server management module 81. The server management module 81 performs split brain solution and, when determining that the active server 10 has stopped, instructs the server control module 84 to execute I/O fencing of the active server 10.

This process is a process for executing secure I/O fencing because I/O to and from the shared disk 50 does not completely stop when the OS 20 of the active server 10 cannot perform heart beat communication due to stall. As soon as receiving an I/O fencing instruction from the server management module 81, the server control module 84 notifies the I/O fencing instruction and the slot number of the target PCI card 11 to the BMC 40 of the active server 10 via the network (step S32).

Upon receiving the I/O fencing instruction from the server control module 84 of the standby server 60, the IPMI receiving module 42 of the BMC 40 of the active server 10 executes the I/O fencing process by the BMC 40. That is to say, in the same manner as stated above, the slot of the PCI card 11 connected to the shared disk 50 is reset (step S33), and an I/O fencing completion notification is transmitted to a previously registered notification destination (the IP address of the standby server 60) (step S34).

Then, the clusterware 80 of the standby server 60 receives a notification of the completion of I/O fencing, and executes the cluster reconfiguration process (step S35).

The cluster system according to the present invention operates in the abovementioned manner, and hence, can produce the following effects.

First, the certainty of exclusive control on access to the shared disk increases. This is because the PCI card is reset on the BMC and HW level, and it is possible to stop I/O more securely than in the case of controlling I/O fencing on the software level. For example, it is difficult on the software level to stop inputs/outputs queuing on the card at the time of occurrence of a failure. Moreover, since the external server instructs to execute I/O fencing on a fault server in which the OS determined to have stalled or stopped, it is possible to securely execute I/O fencing.

Further, it is possible to realize high-speed failover. This is because, after completion of I/O fencing, network notification is performed from the BMC of the active server to the clusterware of the standby server. Since a general clusterware detects a heart beat communication abnormality (timeout) to determine that the active server has stopped, a timeout time is required. On the other hand, according to the present invention, not timeout but notification from the BMC leads to execution of failover, so that it is possible to shorten a time to start failover.

Although a cluster configuration including two servers has been described above, it is also possible to realize an equivalent system by a cluster configuration including three or more servers by registering a plurality of IP addresses of I/O fencing notification targets. Moreover, also in an active-active cluster configuration, it is possible to realize the proposed system by the same configuration as an active-standby type.

<Supplementary Notes>

Figure 10:
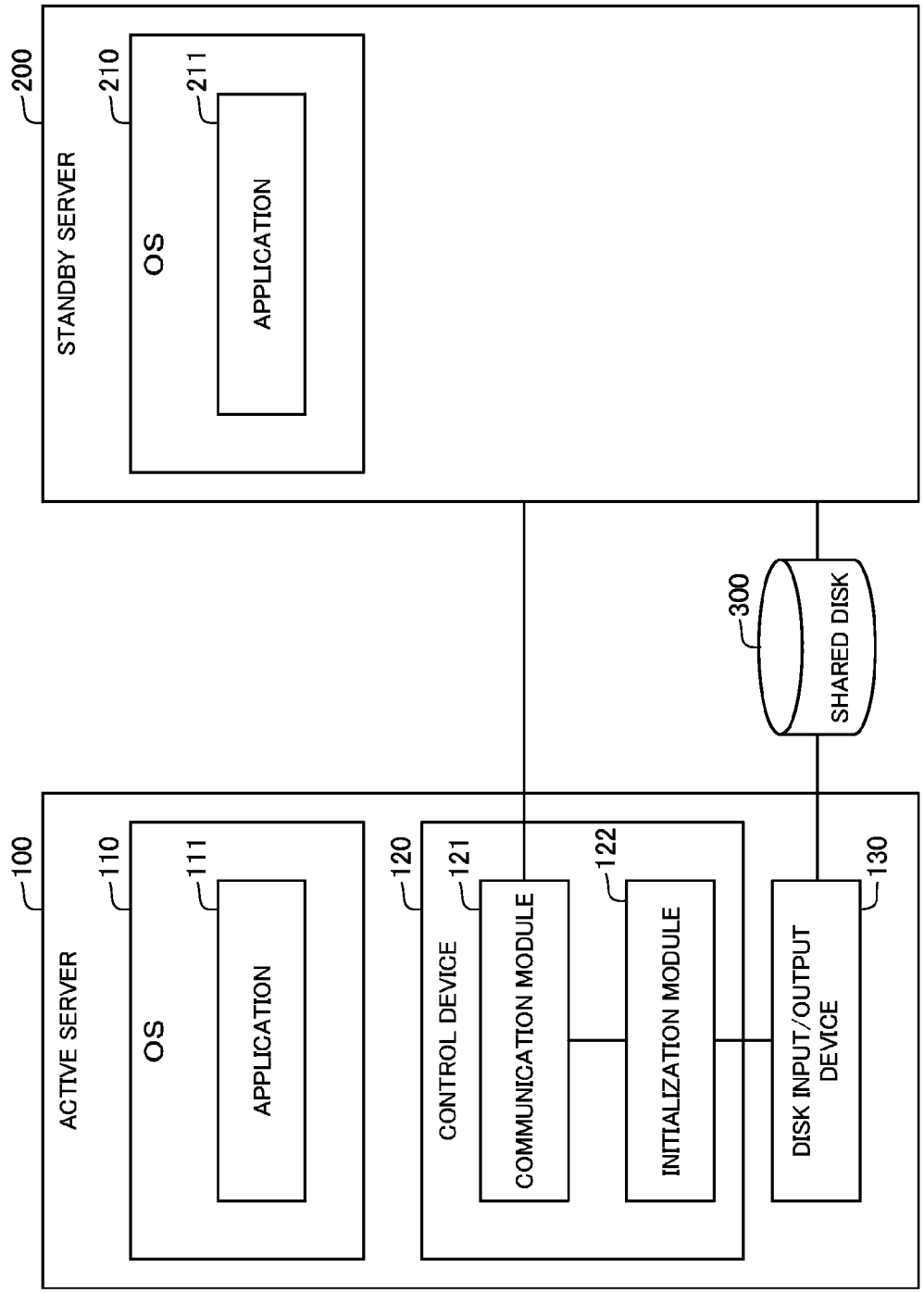
FIG. 10 is a block diagram showing a configuration of a cluster system in Supplementary Note 1 of the present invention.

The whole or part of the exemplary embodiments disclosed above can be described as the following supplementary notes. Below, the outline of configurations of a cluster system (refer to FIG. 10), an active server, a program and a failover method according to the present invention will be described. However, the present invention is not limited to the following configurations.

(Supplementary Note 1)

A cluster system comprising:

an active server 100 and a standby server 200 configured to execute mutually identical applications 111 and 211 and having a failover function enabling one of the servers to take over the other's processing by the application; and a shared disk 300 storing data that can be shared by the active server and the standby server, wherein:

the active server 100 includes a control device 120 configured to operate free of influence from an operating system 110 installed in the active server, and a disk input/output device 130 connected to the shared disk and configured to input and output data into and from the shared disk;

the control device 120 of the active server 100 includes a communication module 121 configured to communicate with the standby server, and an initialization module 122 configured to, when a failure occurs in the active server, initialize the disk input/output device 130 to execute I/O fencing on the shared disk and also notify completion of the I/O fencing to the standby server 200 via the communication module 121; and the standby server 200 has a failover function that, in response to notification of completion of the I/O fencing from the control device of the active server, the application on the standby server takes over processing by the application on the active server.

(Supplementary Note 2)

The cluster system according to Supplementary Note 1, wherein:

the active server includes a failure detection module configured to detect occurrence of a failure of software operating on the active server and notify to the communication module of the control device; and the initialization module of the control device is configured to, upon receiving notification of occurrence of a failure in the active server from the failure detection module, initialize the disk input/output device to execute I/O fencing on the shared disk and also notify completion of the I/O fencing to the standby server via the communication module.

(Supplementary Note 3)

The cluster system according to Supplementary Note 1 or 2, wherein:

the control device of the active server includes a hardware failure detection module configured to detect occurrence of a failure of hardware installed in the active server and notify to the initialization module of the control device; and the initialization module of the control device is configured to, upon receiving notification of occurrence of a failure in the active server from the hardware failure detection module, initialize the disk input/output device to execute I/O fencing on the shared disk and also notify completion of the I/O fencing to the standby server via the communication module.

(Supplementary Note 4)

The cluster system according to any of Supplementary Notes 1 to 3, wherein:

the standby server includes a standby-side failure detection module configured to detect occurrence of a failure in the active server and notify to the initialization module of the active server; and the initialization module of the active server is configured to, upon receiving notification of occurrence of a failure in the active server from the standby-side failure detection module of the standby server, initialize the disk input/output device to execute I/O fencing on the shared disk and also notify completion of the I/O fencing to the standby server via the communication module.

(Supplementary Note 5)

The cluster system according to any of Supplementary Notes 1 to 4, wherein the initialization module stores access information for accessing the disk input/output device and address information for notifying information to the standby server, and is configured to initialize the disk input/output device based on the access information to execute I/O fencing on the shared disk and also notify completion of the I/O fencing to the standby server via the communication module based on the address information.

(Supplementary Note 6)

The cluster system according to Supplementary Note 5, wherein:

the active server is configured to, when the active server starts, load a configuration file in which the access information and the address information are previously set and notify the access information and the address information set in the configuration file to the initialization module of the control device; and the initialization module stores the access information and the address information notified thereto.

(Supplementary Note 7)

An active server included by a cluster system including: the active server and a standby server configured to execute mutually identical applications and having a failover function enabling one of the servers to take over the other's processing by the application; and a shared disk storing data that can be shared by the active server and the standby server, the active server including: a control device configured to operate free of influence from an operating system installed in the active server; and a disk input/output device connected to the shared disk and configured to input and output data into and from the shared disk, wherein the control device includes a communication module configured to communicate with the standby server, and an initialization module configured to, when a failure occurs in the active server, initialize the disk input/output device to execute I/O fencing on the shared disk and also notify completion of the I/O fencing to the standby server via the communication module.

(Supplementary Note 7-2)

The active server according to Supplementary Note 7, wherein:

the active server includes a failure detection module configured to detect occurrence of a failure of software operating on the active server and notify to the initialization module; and the initialization module is configured to, upon receiving notification of occurrence of a failure in the active server from the failure detection module, initialize the disk input/output device to execute I/O fencing on the shared disk and also notify completion of the I/O fencing to the standby server via the communication module.

(Supplementary Note 7-3)

The active server according to Supplementary Note 7 or 7-2, wherein:

the control device includes a hardware failure detection module configured to detect occurrence of a failure of hardware installed in the active server and notify to the initialization module; and the initialization module is configured to, upon receiving notification of occurrence of a failure in the active server from the hardware failure detection module, initialize the disk input/output device to execute I/O fencing on the shared disk and also notify completion of the I/O fencing to the standby server via the communication module.

(Supplementary Note 7-4)

The active server according to any of Supplementary Notes 7 to 7-3, wherein:

the standby server includes a standby-side failure detection module configured to detect occurrence of a failure in the active server and notify to the initialization module of the active server; and the initialization module is configured to, upon receiving notification of occurrence of a failure in the active server from the standby-side failure detection module of the standby server, initialize the disk input/output device to execute I/O fencing on the shared disk and also notify completion of the I/O fencing to the standby server via the communication module.

(Supplementary Note 8)

A non-transitory computer-readable medium storing a program comprising instructions for causing a control device included by an active server included by a cluster system to execute processing by an initialization module, wherein:

the cluster system includes the active server and a standby server configured to execute mutually identical applications and having a failover function enabling one of the servers to take over the other's processing by the application, and a shared disk storing data that can be shared by the active server and the standby server;

the active server includes the control device configured to operate free of influence from an operating system installed in the active server, and a disk input/output device connected to the shared disk and configured to input and output data into and from the shared disk;

the control device includes the communication module configured to communicate with the standby server; and the initialization module is configured to, when a failure occurs in the active server, initialize the disk input/output device to execute I/O fencing on the shared disk and also notify completion of the I/O fencing to the standby server via the communication module.

(Supplementary Note 8-2)

The non-transitory computer-readable medium storing the program according to Supplementary Note 8, wherein:

the active server includes a failure detection module configured to detect occurrence of a failure of software operating on the active server and notify to the initialization module; and the initialization module is configured to, upon receiving notification of occurrence of a failure in the active server from the failure detection module, initialize the disk input/output device to execute I/O fencing on the shared disk and also notify completion of the I/O fencing to the standby server via the communication module.

(Supplementary Note 8-3)

The non-transitory computer-readable medium storing the program according to Supplementary Note 8 or 8-2, wherein:

the control device includes a hardware failure detection module configured to detect occurrence of a failure of hardware installed in the active server and notify to the initialization module; and the initialization module is configured to, upon receiving notification of occurrence of a failure in the active server from the hardware failure detection module, initialize the disk input/output device to execute I/O fencing on the shared disk and also notify completion of the I/O fencing to the standby server via the communication module.

(Supplementary Note 8-4)

The non-transitory computer-readable medium storing the program according to any of Supplementary Notes 8 to 8-3, wherein:

the standby server includes a standby-side failure detection module configured to detect occurrence of a failure in the active server and notify to the initialization module of the active server; and the initialization module of the active server is configured to, upon receiving notification of occurrence of a failure in the active server from the standby-side failure detection module of the standby server, initialize the disk input/output device to execute I/O fencing on the shared disk and also notify completion of the I/O fencing to the standby server via the communication module.

(Supplementary Note 9)

A failover method by a cluster system including: an active server and a standby server configured to execute mutually identical applications and having a failover function enabling one of the servers to take over the other's processing by the application; and a shared disk storing data that can be shared by the active server and the standby server, wherein:

the active server includes a control device configured to operate free of influence from an operating system installed in the active server, and a disk input/output device connected to the shared disk and configured to input and output data into and from the shared disk; and the control device includes a communication module configured to communicate with the standby server, the failover method comprising:

when a failure occurs in the active server, initializing the disk input/output device to execute I/O fencing on the shared disk and notifying completion of the I/O fencing to the standby server via the communication module, by the control device of the active server; and in response to notification of completion of the I/O fencing from the control device of the active server, making the application on the standby server take over processing by the application on the active server, by the standby server.

(Supplementary Note 9-2)

The failover method according to Supplementary Note 9, comprising:

detecting occurrence of a failure of software operating on the active server and notifying to the control device, by the active server; and upon receiving notification of occurrence of a failure of the software operating on the active server, initializing the disk input/output device to execute I/O fencing on the shared disk and also notifying completion of the I/O fencing to the standby server via the communication module, by the control device of the active server.

(Supplementary Note 9-3)

The failover method according to Supplementary Note 9 or 9-2, comprising:

upon detecting occurrence of a failure of hardware installed in the active server, initializing the disk input/output device to execute I/O fencing on the shared disk and also notifying completion of the I/O fencing to the standby server via the communication module, by the control device of the active server.

(Supplementary Note 9-4)

The failover method according to any of Supplementary Notes 9 to 9-3, comprising:

upon receiving notification of occurrence of a failure in the active server from the standby server, initializing the disk input/output device to execute I/O fencing on the shared disk and also notifying completion of the I/O fencing to the standby server via the communication module, by the control device of the active server.

(Supplementary Note 10)

A failover method by a cluster system including: an active server and a standby server configured to execute mutually identical applications and having a failover function enabling one of the servers to take over the other's processing by the application; and a shared disk storing data that can be shared by the active server and the standby server, wherein:

the active server includes a control device configured to operate free of influence from an operating system installed in the active server, and a disk input/output device connected to the shared disk and configured to input and output data into and from the shared disk; and the control device includes a communication module configured to communicate with the standby server, the failover method comprising:

when a failure occurs in the active server, initializing the disk input/output device to execute I/O fencing on the shared disk and notifying completion of the I/O fencing to the standby server via the communication module, by the control device of the active server.

The abovementioned program is stored in the storage device, or recorded on a computer-readable recording medium. For example, the recording medium is a portable medium such as a flexible disk, an optical disk, a magnet-optical disk and a semiconductor memory.

Although the present invention has been described above by referring to the exemplary embodiments, the present invention is not limited to the exemplary embodiments described above. The configurations and details of the present invention can be modified in various manners that can be understood by one skilled in the art within the scope of the present invention.

The invention claimed is:

1. A cluster system comprising:
   an active server and a standby server configured to execute mutually identical applications and having a failover function enabling one of the servers to take over the other's processing by the application; and
   a shared disk storing data that can be shared by the active server and the standby server, wherein:
   the active server includes a control device configured to operate free of influence from an operating system installed in the active server, and a disk input/output device connected to the shared disk and configured to input and output data into and from the shared disk;
   the control device of the active server includes a communication module configured to communicate with the standby server, and an initialization module configured to, when a failure occurs in the active server, initialize the disk input/output device to execute I/O fencing on the shared disk and also notify completion of the I/O fencing to the standby server via the communication module; and
   the standby server has a failover function that, in response to notification of completion of the I/O fencing from the control device of the active server, the application on the standby server takes over processing by the application on the active server.

2. The cluster system according to claim 1, wherein:
   the active server includes a failure detection module configured to detect occurrence of a failure of software operating on the active server and notify to the communication module of the control device; and the initialization module of the control device is configured to, upon receiving notification of occurrence of a failure in the active server from the failure detection module, initialize the disk input/output device to execute I/O fencing on the shared disk and also notify completion of the I/O fencing to the standby server via the communication module.

3. The cluster system according to claim 1, wherein:
the control device of the active server includes a hardware failure detection module configured to detect occurrence of a failure of hardware installed in the active server and notify to the initialization module of the control device; and
the initialization module of the control device is configured to, upon receiving notification of occurrence of a failure in the active server from the hardware failure detection module, initialize the disk input/output device to execute I/O fencing on the shared disk and also notify completion of the I/O fencing to the standby server via the communication module.

4. The cluster system according to claim 1, wherein:
the standby server includes a standby-side failure detection module configured to detect occurrence of a failure in the active server and notify to the initialization module of the active server; and
the initialization module of the active server is configured to, upon receiving notification of occurrence of a failure in the active server from the standby-side failure detection module of the standby server, initialize the disk input/output device to execute I/O fencing on the shared disk and also notify completion of the I/O fencing to the standby server via the communication module.

5. The cluster system according to claim 1, wherein the initialization module stores access information for accessing the disk input/output device and address information for notifying information to the standby server, and is configured to initialize the disk input/output device based on the access information to execute I/O fencing on the shared disk and also notify completion of the I/O fencing to the standby server via the communication module based on the address information.

6. The cluster system according to claim 5, wherein:
the active server is configured to, when the active server starts, load a configuration file in which the access information and the address information are previously set and notify the access information and the address information set in the configuration file to the initialization module of the control device; and
the initialization module stores the access information and the address information notified thereto.

7. An active server included by a cluster system including: the active server and a standby server configured to execute mutually identical applications and having a failover function enabling one of the servers to take over the other's processing by the application; and a shared disk storing data that can be shared by the active server and the standby server,
the active server including: a control device configured to operate free of influence from an operating system installed in the active server; and a disk input/output device connected to the shared disk and configured to input and output data into and from the shared disk,
wherein the control device includes a communication module configured to communicate with the standby server, and an initialization module configured to, when a failure occurs in the active server, initialize the disk input/output device to execute I/O fencing on the shared disk and also notify completion of the I/O fencing to the standby server via the communication module.

8. The active server according to claim 7, wherein:
the active server includes a failure detection module configured to detect occurrence of a failure of software operating on the active server and notify to the initialization module; and
the initialization module is configured to, upon receiving notification of occurrence of a failure in the active server from the failure detection module, initialize the disk input/output device to execute I/O fencing on the shared disk and also notify completion of the I/O fencing to the standby server via the communication module.

9. The active server according to claim 7, wherein:
the control device includes a hardware failure detection module configured to detect occurrence of a failure of hardware installed in the active server and notify to the initialization module; and
the initialization module is configured to, upon receiving notification of occurrence of a failure in the active server from the hardware failure detection module, initialize the disk input/output device to execute I/O fencing on the shared disk and also notify completion of the I/O fencing to the standby server via the communication module.

10. The active server according to claim 7, wherein:
the standby server includes a standby-side failure detection module configured to detect occurrence of a failure in the active server and notify to the initialization module of the active server; and
the initialization module is configured to, upon receiving notification of occurrence of a failure in the active server from the standby-side failure detection module of the standby server, initialize the disk input/output device to execute I/O fencing on the shared disk and also notify completion of the I/O fencing to the standby server via the communication module.

11. A failover method by a cluster system including: an active server and a standby server configured to execute mutually identical applications and having a failover function enabling one of the servers to take over the other's processing by the application; and a shared disk storing data that can be shared by the active server and the standby server, wherein:
the active server includes a control device configured to operate free of influence from an operating system installed in the active server, and a disk input/output device connected to the shared disk and configured to input and output data into and from the shared disk; and
the control device includes a communication module configured to communicate with the standby server,
the failover method comprising:
when a failure occurs in the active server, initializing the disk input/output device to execute I/O fencing on the shared disk and notifying completion of the I/O fencing to the standby server via the communication module, by the control device of the active server.

12. The failover method according to claim 11, comprising:
detecting occurrence of a failure of software operating on the active server and notifying to the control device, by the active server; and
upon receiving notification of occurrence of a failure of the software operating on the active server, initializing the disk input/output device to execute I/O fencing on the shared disk and also notifying completion of the I/O fencing to the standby server via the communication module, by the control device of the active server.

13. The failover method according to claim 11, comprising:
- upon detecting occurrence of a failure of hardware installed in the active server, initializing the disk input/output device to execute I/O fencing on the shared disk and also notifying completion of the I/O fencing to the standby server via the communication module, by the control device of the active server.

14. The failover method according to claim 11, comprising:
- upon receiving notification of occurrence of a failure in the active server from the standby server, initializing the disk input/output device to execute I/O fencing on the shared disk and also notifying completion of the I/O fencing to the standby server via the communication module, by the control device of the active server.

* * * * *